(12) United States Patent
Nousiainen et al.

(10) Patent No.: US 6,470,132 B1
(45) Date of Patent: Oct. 22, 2002

(54) OPTICAL HINGE APPARATUS

(75) Inventors: Jaakko Nousiainen, Marttila; Terho Kaikuranta, Piispanristi; Marcus Schorpp, Tampere, all of (FI)

(73) Assignee: Nokia Mobile Phones Ltd., Espoo (FI)

( * ) Notice: Subject to any disclaimer, the term of this patent is extended or adjusted under 35 U.S.C. 154(b) by 8 days.

(21) Appl. No.: 09/655,651

(22) Filed: Sep. 5, 2000

(51) Int. Cl.[7] .................................................. G02B 6/10
(52) U.S. Cl. ........................................................ 385/146
(58) Field of Search .............................. 385/146, 8, 53, 385/147

(56) References Cited

U.S. PATENT DOCUMENTS

| | | | |
|---|---|---|---|
| 5,889,602 A | * | 3/1999 | Johnson et al. ............. 359/154 |
| 6,256,447 B1 | * | 7/2001 | Laine .......................... 385/146 |
| 2001/0051014 A1 | * | 12/2001 | Behin et al. .................. 385/16 |

* cited by examiner

Primary Examiner—Brian Sircus
Assistant Examiner—Michael C. Zarroli
(74) Attorney, Agent, or Firm—Ware, Fressola, Van Der Sluys & Adolphson LLP; Bradford Green

(57) ABSTRACT

An optical hinge and an optical hinge apparatus for providing an optical link between a first circuit board and a second circuit board. The optical hinge is made of two optical components, separated by an air gap, to allow a light beam to transmit from one optical component to another via the air gap. The optical components can be rotated relative to each other along a rotation axis. Each of the optical components is optically coupled to an opto-electronic device on a circuit board. Preferably, the light beam is transmitted through the air gap along an optical path which is substantially parallel to or coincident with the rotation axis. The light beam can be used to carry optical signals in order to convey communication data from one circuit board to another. The optical signals can be transmitted in infrared frequencies or visible frequencies.

62 Claims, 11 Drawing Sheets

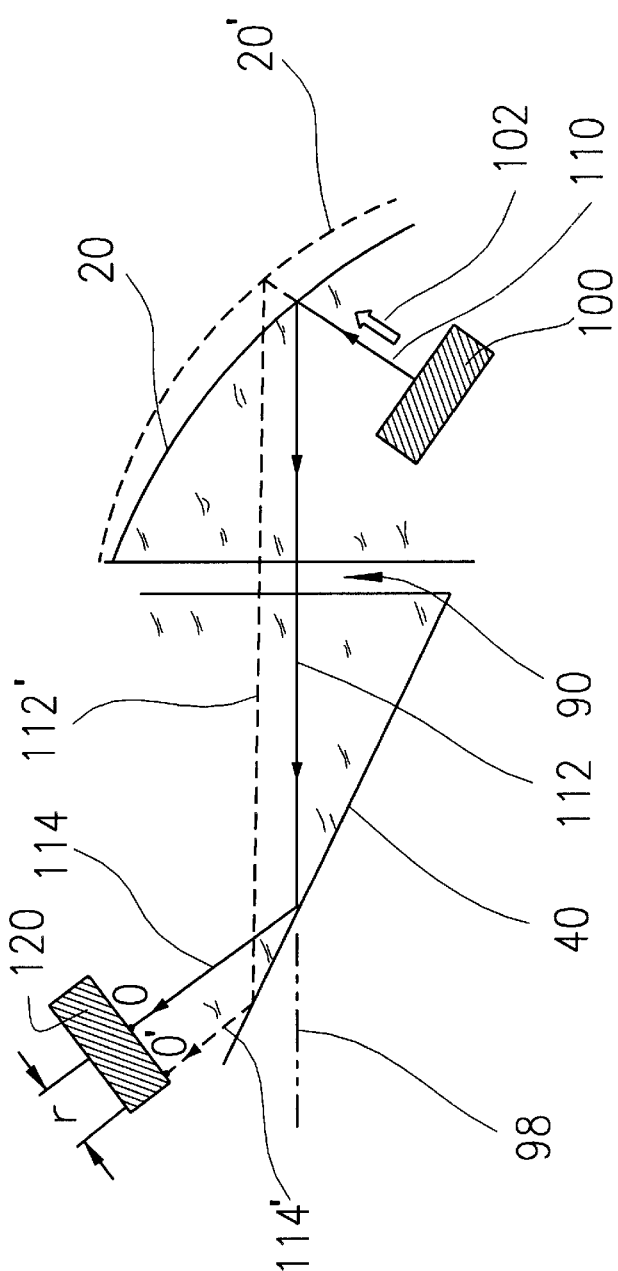
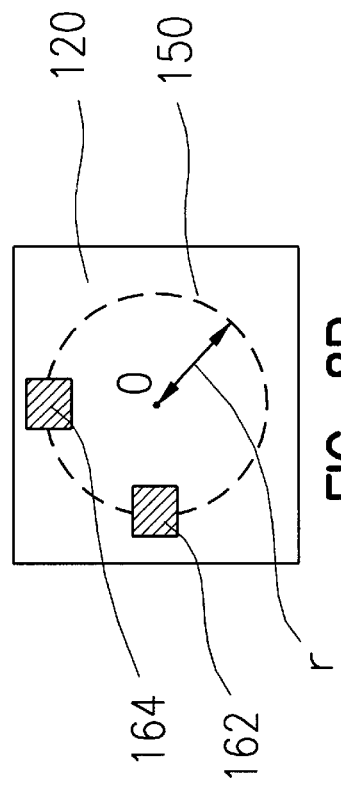
FIG. 8A
FIG. 8B

OPTICAL HINGE APPARATUS

FIELD OF THE INVENTION

The present invention relates generally to an optical link and, more particularly to a light guide for transmitting a light beam from one part of the light guide to another.

BACKGROUND OF THE INVENTION

In a portable electronic device such as a Nokia Communicator, which has a display that is mechanically linked to a keyboard for rotation so that the display can be collapsed upon the keyboard in a closed position or to be flipped away from the keyboard in an open position. In such an electronic device, information to be displayed on the display is conveyed from the keyboard via a flat cable, which is usually a parallel data-bus. Typically, the flat cable is connected to one flat cable connector on a circuit board of the display side and to another flat cable connector on a circuit board of the keyboard side. Flat cable is comprised of a plurality of metal wires to carry electrical current, and these metal wires are individually surrounded by a protective jacket. Bad connections are known to occur to the flat cable connectors over time. Furthermore, sharp objects and corrosive agents can accidentally break the flat cable, thereby interrupting the communication between the display and the keyboard. Moreover, a flat cable has a width depending on the number of wires. With a 50-pin parallel bus, the width of the flat cable and the connectors can occupy a large area of the display, the printed circuit board (PCB), and the keyboard.

It is advantageous and desirable to provide an optical link between the display and the keyboard in a portable electronic device so that data communication between the display and the keyboard can be carried out with optical signals, instead of electrical signals. The optical link can eliminate the problems associated with the flat cable and the flat cable connectors.

SUMMARY OF THE INVENTION

The object of the invention is to use a small number of optical devices to provide a communication link between two circuit boards. Preferably, the optical devices are capable of carrying communication data in a serial manner.

Thus, the first aspect of the present invention is an optical hinge, which serves as a light guide to convey communication data in optical signals between two circuit boards having opto-electronic devices for transmitting and receiving optical signals. The optical hinge is comprised of:

a first optical component having a first cavity for optically coupling the first optical component to a first opto-electronic device, which is capable of providing a light beam, so as to allow the light beam to be transmitted through the first cavity along a first optical path; and a second optical component having a second cavity for optically coupling the second optical component to the second opto-electronic device, wherein the second optical component is capable of rotating relative to the first optical component at a rotation angle along a rotation axis, and wherein the first optical component has a first reflecting surface for directing the light beam transmitted along the first optical path towards the second optical component along a second optical path, and wherein the second optical component has a second reflecting surface to redirect the light beam transmitted along the second optical path towards the second cavity along a third optical path, so as to allow the light beam to reach the second opto-electronic device.

Preferably, the first and second reflecting surfaces are total internal reflection surfaces.

Preferably, the first cavity has a spherical surface for focusing the light beam prior to the light beam being transmitted along the first optical path.

Preferably, the first reflecting surface is a spherical surface, for example, for focusing the light beam while directing the light beam towards the second optical path.

Preferably, the first optical component has at least one socket and the second optical component has at least one stud mechanically engaged in the socket, so as to allow the second optical component to rotate relative to the first optical component along the rotation axis.

The second aspect of the present invention is an optical hinge apparatus for providing an optical link between a first circuit board having a first opto-electronic device capable of providing a light beam and a second circuit board having a second opto-electronic device, wherein the first circuit board is mechanically linked to the second circuit board, so as to allow the second circuit board to rotate relative to the first circuit board along a rotation axis. The optical hinge apparatus comprises:

a first optical component mounted on the first circuit board; and a second optical component mounted on the second circuit board, wherein the first optical component has a first boundary surface, and the second optical component has a second boundary surface adjacent to the first boundary surface, defining an air gap, which is substantially located on the rotation axis, and wherein the first optical component is optically coupled to first opto-electronic device to receive the light beam in order to transmit the light beam through the air gap to the second optical component, and wherein the second optical component is optically coupled to the second opto-electronic device in order to transmit the light beam to the second opto-electronic device.

Preferably, the first optical component has a first cavity for optically coupling the first optical component to the first opto-electronic device, so as to allow the light beam to be transmitted through the first cavity along a first optical path, and the second optical component has a second cavity for optically coupling the second optical component to the second opto-electronic device.

Preferably, a plurality of electrically conducting wires are used to connect the first circuit board and the second circuit board to a power source in order to provide electrical power to the first and second opto-electronic devices.

Preferably, the first optical component has a first reflecting surface to direct the light beam transmitted along the first optical path towards the second optical component along a second optical path, and wherein the second optical component has a second reflecting surface to redirect the light beam transmitted along the second optical path towards the second cavity along a third optical path, so as to allow the light beam to reach the second opto-electronic device.

Preferably, the second optical path is parallel to or substantially coincident with the rotation axis.

Preferably, the first circuit board has at least one mounting pin and the first optical component has at least a mounting hole engaged with the mounting pins for mounting the first optical component to the first circuit board.

The present invention will become apparent upon reading the description taken in conjunction with FIG. 1 to 9b.

BRIEF DESCRIPTION OF THE DRAWINGS

FIG. 8a is a diagrammatic representation illustrating the relationship between the rotation axis and the optical path.

FIG. 8b is a diagrammatic representation illustrating the effect of optical paths on the receiver.

DETAILED DESCRIPTION

Figure 1:
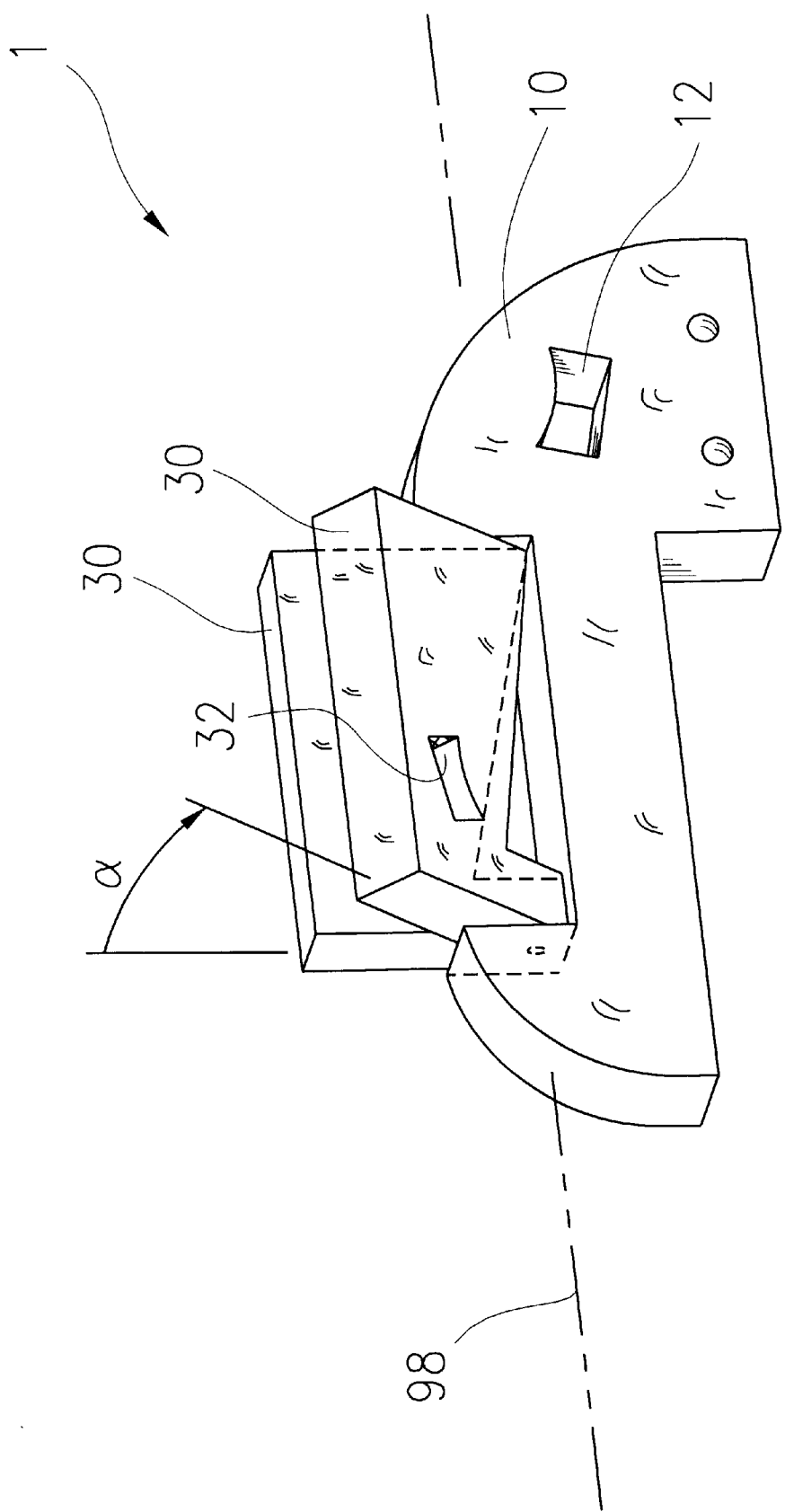
FIG. 1 is a perspective view illustrating an optical hinge wherein the second optical component of the optical hinge can rotate relative to the first optical component to different positions, according to the preferred embodiment of the present invention.

FIG. 1 shows the preferred embodiment of the optical hinge 1, according to the present invention. As shown, the optical hinge 1 has a first optical component 10 and a second optical component 30 which is capable of rotating along a rotation axis 98 at an angle α. The rotation angle is typically in a range of −90 degrees to 90 degrees. However, it can be designed so that the rotation angle α can cover a larger range, up to −180 degrees to 180 degrees, if so desired. The first and second optical components are made from an optical material. Preferably, the material is highly transparent to the optical wavelength of interest. For example, if the optical hinge 1 is a light guide for infrared light, then the material must have low absorption and scattering in the infra-red frequencies. As shown, the first optical component 10 has a cavity 12 which is used to optically couple the first optical component 10 to an opto-electronic device, and the second optical component 30 has a cavity 32 which is used to optically couple the second optical component 30 to another opto-electronic device. Typically, the opto-electronic devices of interest are photo-transceivers, light-emitters and photosensors. The object of the optical hinge 1 is to transmit a light beam (see FIG. 2) produced by an opto-electronic device coupled to one cavity to another opto-electronic device coupled to the other cavity. In that respect, the optical hinge 1 serves as a light guide or conduit between two opto-electronic devices, separately coupled to the two optical components 10 and 30.

Figure 2:
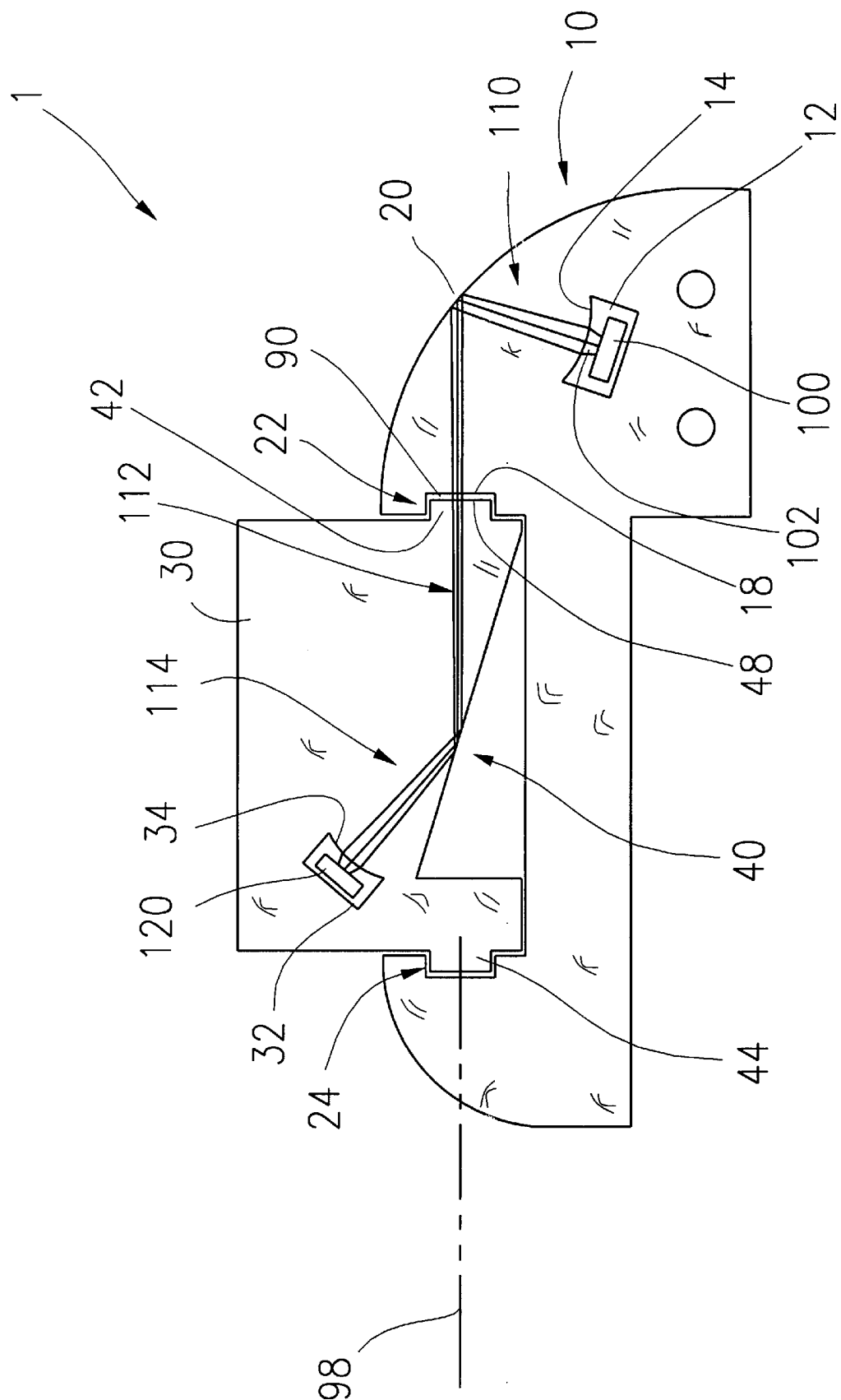
FIG. 2 is a diagrammatic representation illustrating the optical paths in the optical hinges.

FIG. 2 illustrates the principle of light guiding using the optical hinge 1. As shown in FIG. 2, the first optical component 10 has a socket 22 and a socket 24 along a rotation axis 98. The second optical component 30 has a stud 42 and a stud 44 rotatably engaged with the sockets 22 and 24, respectively. For illustrative purposes, a first opto-electronic device 100, which is a light-emitter, is inserted into the cavity 12 of the first optical component 10. The first opto-electronic device 100 is capable of producing a light beam 102 toward a cavity surface 14 which is optically smooth so as not to significantly disturb the wavefronts of the light beam 102. Preferably, the cavity surface 14 is curved or spherical in order to focus the light beam 102 as the light beam 102 is transmitted along an optical path 110. As the light beam 102 encounters the surface 20 of the first optical component 10 at a sufficiently large incident angle, the light beam 102 undergoes total-internal reflection at this dense-rare boundary. Preferably, the surface 20 is also spherical in order to help focus the light beam 102 as the light beam is reflected toward the optical path 112. The surface 20 is designed such that the optical path 112 is substantially perpendicular to the dense-rare boundary surface 18 of the socket 22 and the dense-rare boundary surface 48 of the stud 42. It is preferred that the surface 18 and the surface 48 are reasonably flat and smooth for light transmission so that the light beam 102 does not suffer too much transmission loss as it crosses the air gap 90. The second optical component 30 also has a reflecting surface 40 to cause the light beam 102 transmitted along the light path 102 to undergo total internal reflection. Finally, the light beam 102 is transmitted along the light path 114. After the light beam 102 enters the cavity 32 of the second optical component 30, it is received by a second opto-electronic device 120 which is a photosensor located inside the cavity 32. Preferably, the surface 34 is also a spherical surface to help focus the light beam 102 as it enters the cavity 32. If the optical path 112 is substantially aligned with the optical axis 98, then the second opto-electronic device 120 can always receive the light beam 102 produced by the first opto-electronic device 100 regardless of the rotation angle α (see FIG. 1). Thus, while the second optical component 30 is caused to rotate relative to the first optical component 10 along the rotation axis 98, the optical hinge 1 serves as an optical link between the opto-electronic devices 100 and 120. It is well-known in the art that a light beam can carry optical signals to convey information from one opto-electronic device to another. Thus, the optical hinge 1 can serve as a communication link between opto-electronic devices 100 and 120.

It should be noted that the second opto-electronic device 120 can be a light-emitter and the first opto-device 100 can be a photosensor to receive a light beam from the second opto-electronic device 120. Alternatively, both opto-electronic devices 100 and 120 can be photo-transceivers for two-way communications. Depending on the characteristics of the opto-electronic devices 100 and 120, the light beam 102 can carry light waves in visible frequencies or infrared frequencies.

Figure 3:
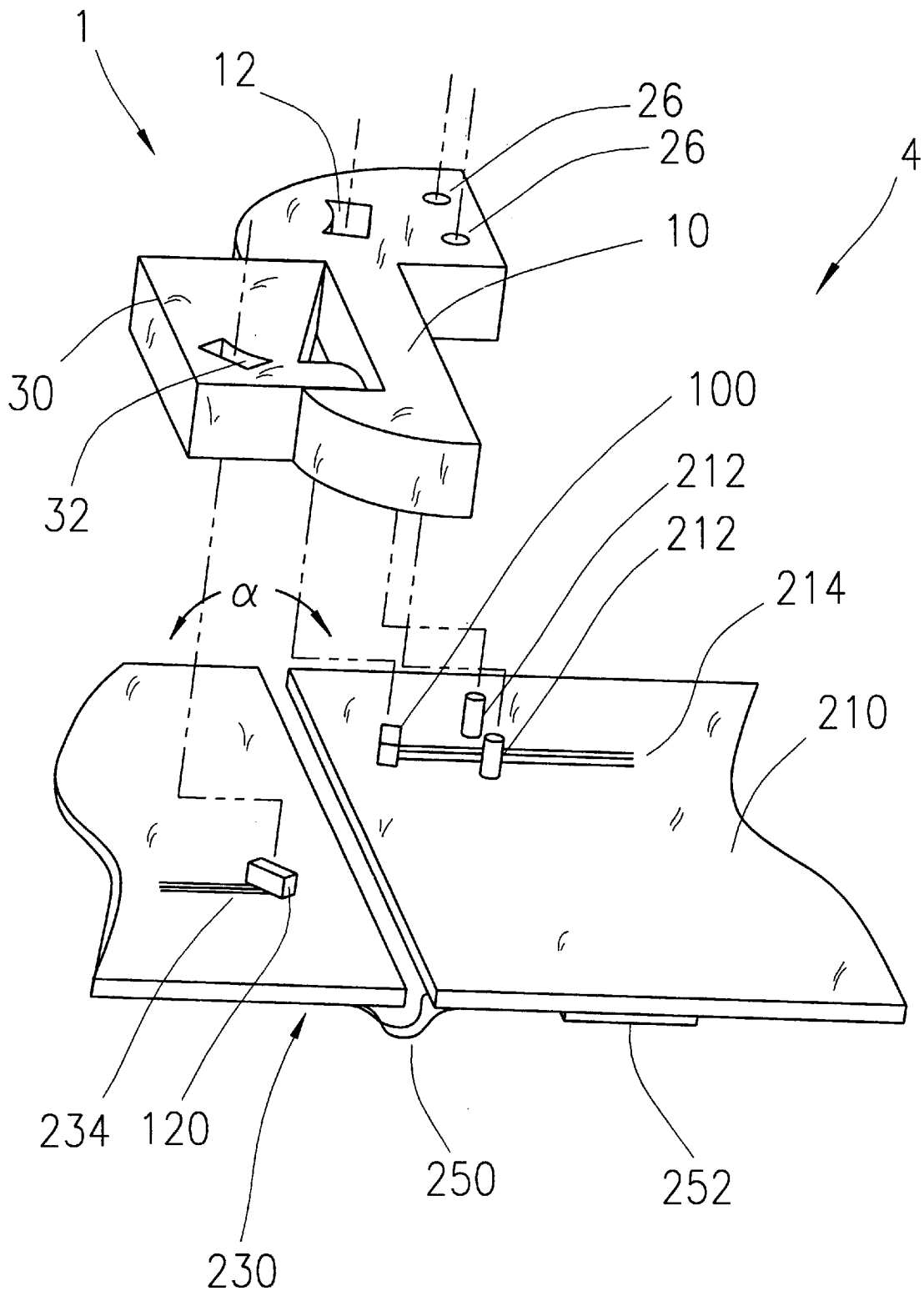
FIG. 3 is a diagrammatic representation illustrating the optical hinge being mounted on two circuit boards.
Figure 6:
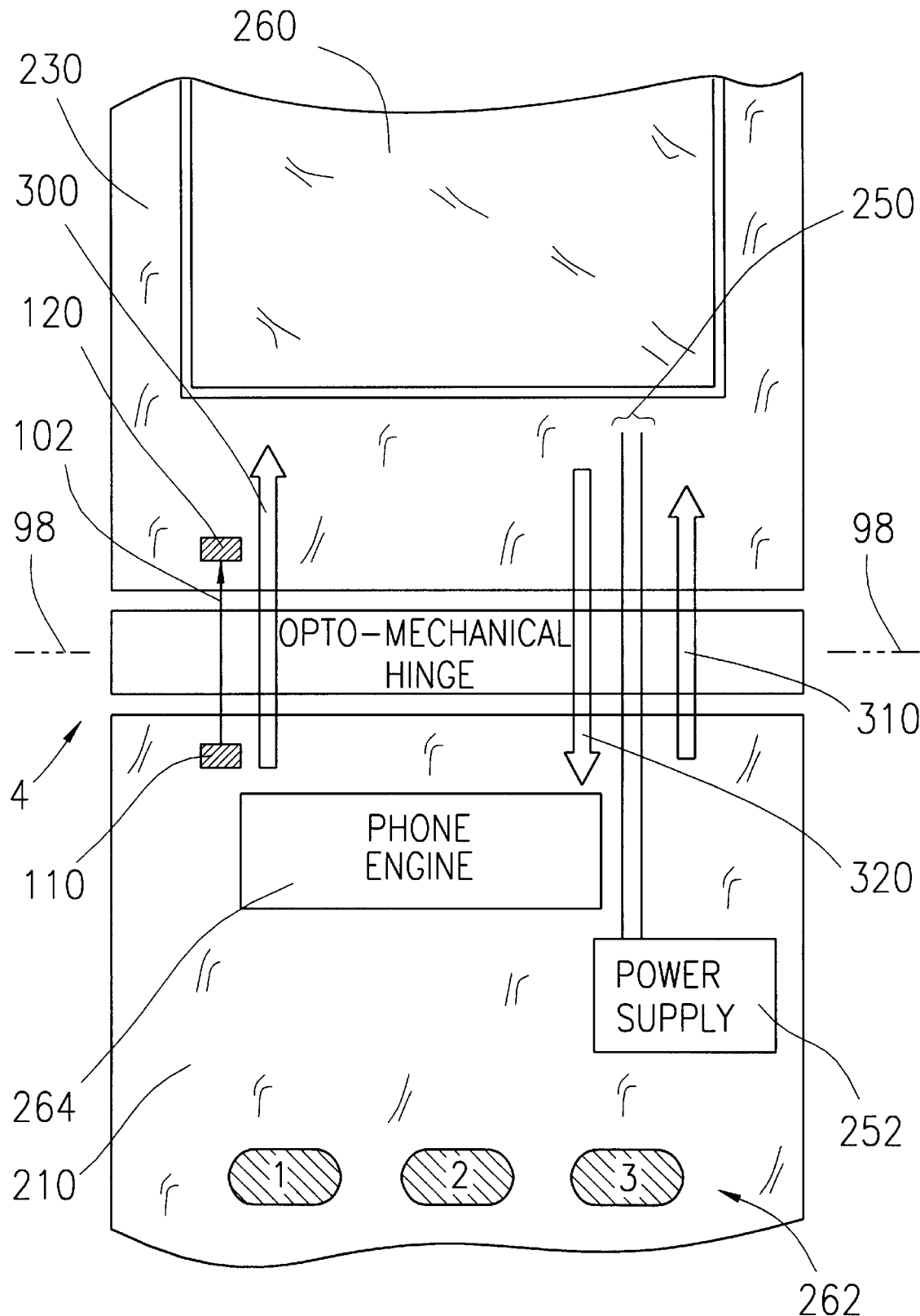
FIG. 6 is a diagrammatic representation illustrating communication links between two circuit boards.

In an electronic device, such as a Nokia Communicator, that has a display and a keyboard mechanically linked so that the Communicator can be closed with the display being collapsed upon the keyboard or opened with the display flipped away from the keyboard, the display is mounted on one circuit board and the keyboard is mounted on another circuit board (see FIG. 6). An electronic device that uses an opto-mechanical device to optically link one circuit board to another is herein referred to as an optical hinge apparatus. FIG. 3 shows the preferred embodiment of the optical hinge apparatus 4, of the present invention, wherein the first optical component 10 and the second optical component 30 of the optical hinge 1 are mounted on a first circuit board 210 and a second circuit board 230, respectively. The first optical component 10 has two mounting holes 26, and the first circuit board 210 has two matched mounting pins 212 for mounting the first optical component 10. The first opto-electronic device 100 is soldered or otherwise fixedly mounted on the first circuit board 210 so that it is appropriately fitted into the cavity 12. A plurality of electrically-conducting wires 214 are connected to the first opto-electronic device 100 in order to power the first opto-electronic device 100 and to convey communication data to and from the opto-electronic device 100. Some of the electric wires 214 are operatively connected to a power source 252. Likewise, the second opto-electronic device 120 is fixedly mounted on the second circuit board 230 so that it is appropriately fitted into the cavity 32 of the second optical component 30. A plurality of electrically-conducting wires 234 are connected to the second opto-electronic device 120 in order to convey communication data to and from the second opto-electronic device 120. Furthermore, a plurality of electrically-conducting wires 250, which are operatively connected to the power source 252, are used to bring electrical power from the first circuit board 210 to the second circuit board 230. The wires 250 are also operatively connected to some of the wires 234 in order to power the second opto-electronic device 120.

Figure 4:
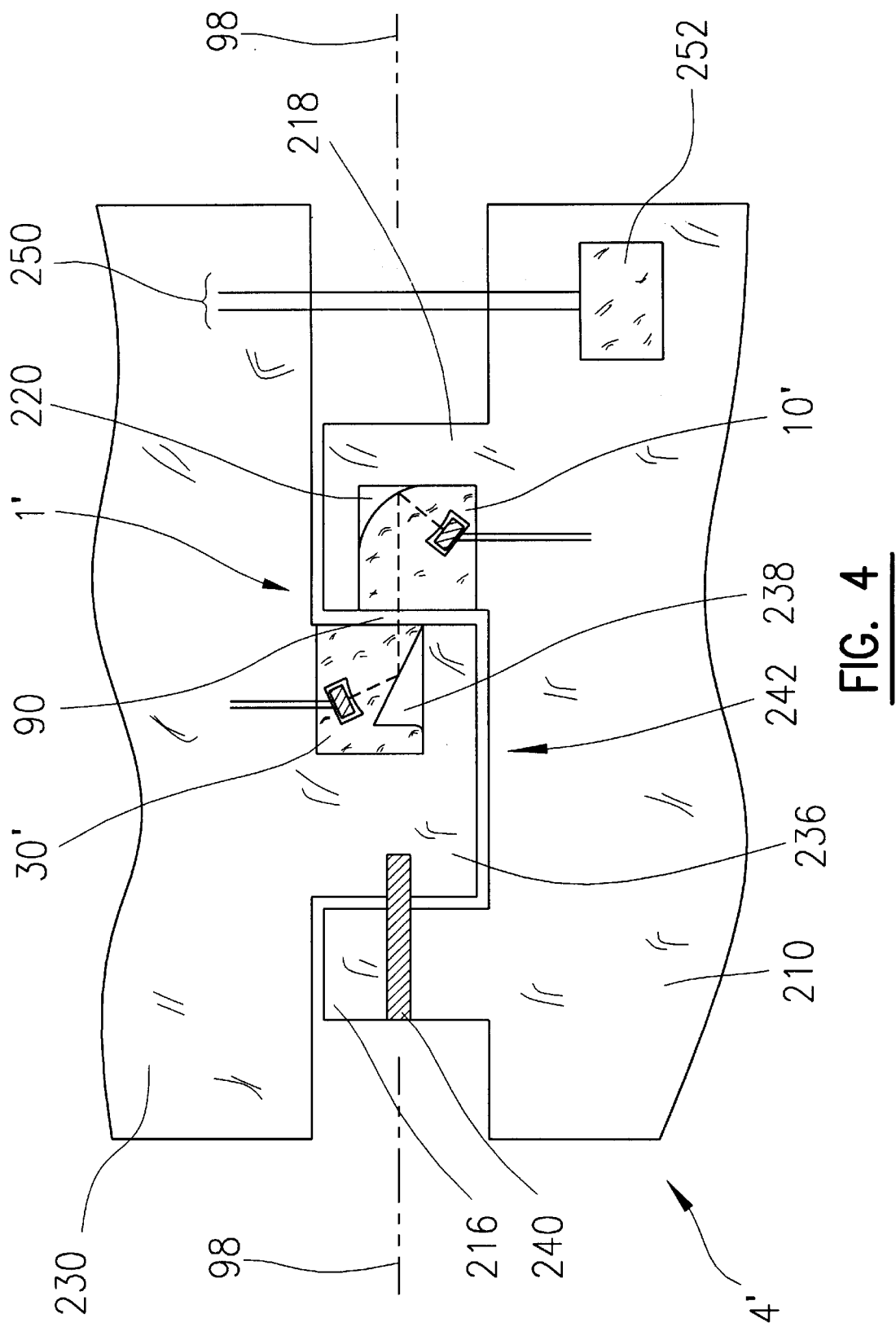
FIG. 4 is a diagrammatic representation illustrating the preferred embodiment of an optical hinge apparatus.

FIG. 4 illustrates another embodiment of the optical hinge apparatus 4', using a different way to mount the optical hinge 1' on the first and second circuit boards 210 and 230. The first circuit board 210 has outer joint sections 216, 218 and the second circuit board 230 has an inner joint section 236. The outer joint sections 216, 218 and the inner joint section 236 are joined by a joint axel 240 to form a mechanical hinge 242, allowing the first and second circuit boards 210, 230 to fold or unfold upon each other, along the rotation axis 98. As shown, the outer joint section 218 has a recess 220 to house a first optical component 10' of the optical hinge 1' and the inner joint section 236 has a recess 238 to house a second optical component 30' of the optical hinge 1'. In that way, the optical hinge 1' is in fact made of two separate pieces: the first optical component 10' and the second optical component 30'. The relative movement of the first and second optical components 10', 30' is controlled by the mechanical hinge 242. However, the function of the optical hinge 1' is identical to that of the optical hinge 1 shown in FIGS. 1–3.

Figure 5A:
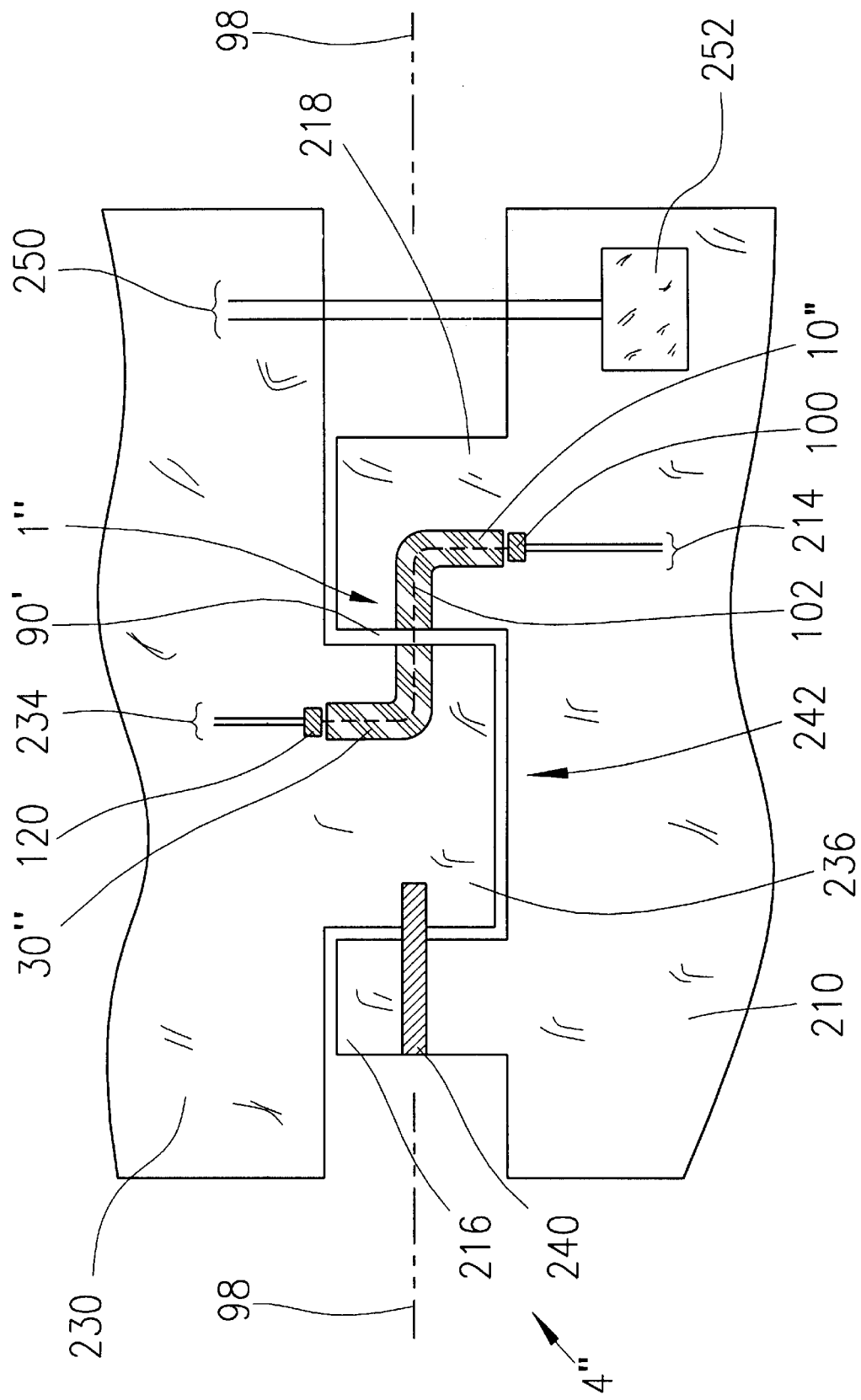
FIG. 5a is a diagrammatic representation illustrating another embodiment of the optical hinge apparatus.

FIG. 5a shows yet another embodiment of the optical hinge apparatus 4". As shown, an optical hinge 1" includes an optical waveguide 10" and an optical waveguide 30". The optical waveguide 10" is mounted on the outer joint section 218, and the optical waveguide 30" is mounted on the inner joint section 236 to define the air gap 90, which is substantially located on the rotation axis 98. The optical waveguides 10" and 30" are, respectively, coupled to the opto-electronic devices 100 and 120 in order to provide an optical link between the opto-electronic devices 100 and 120. It should be noted that the optical waveguide 10" and the optical waveguide 30" can be reduced to a very thin slab or eliminated, as shown in FIG. 5b.

Figure 5B:
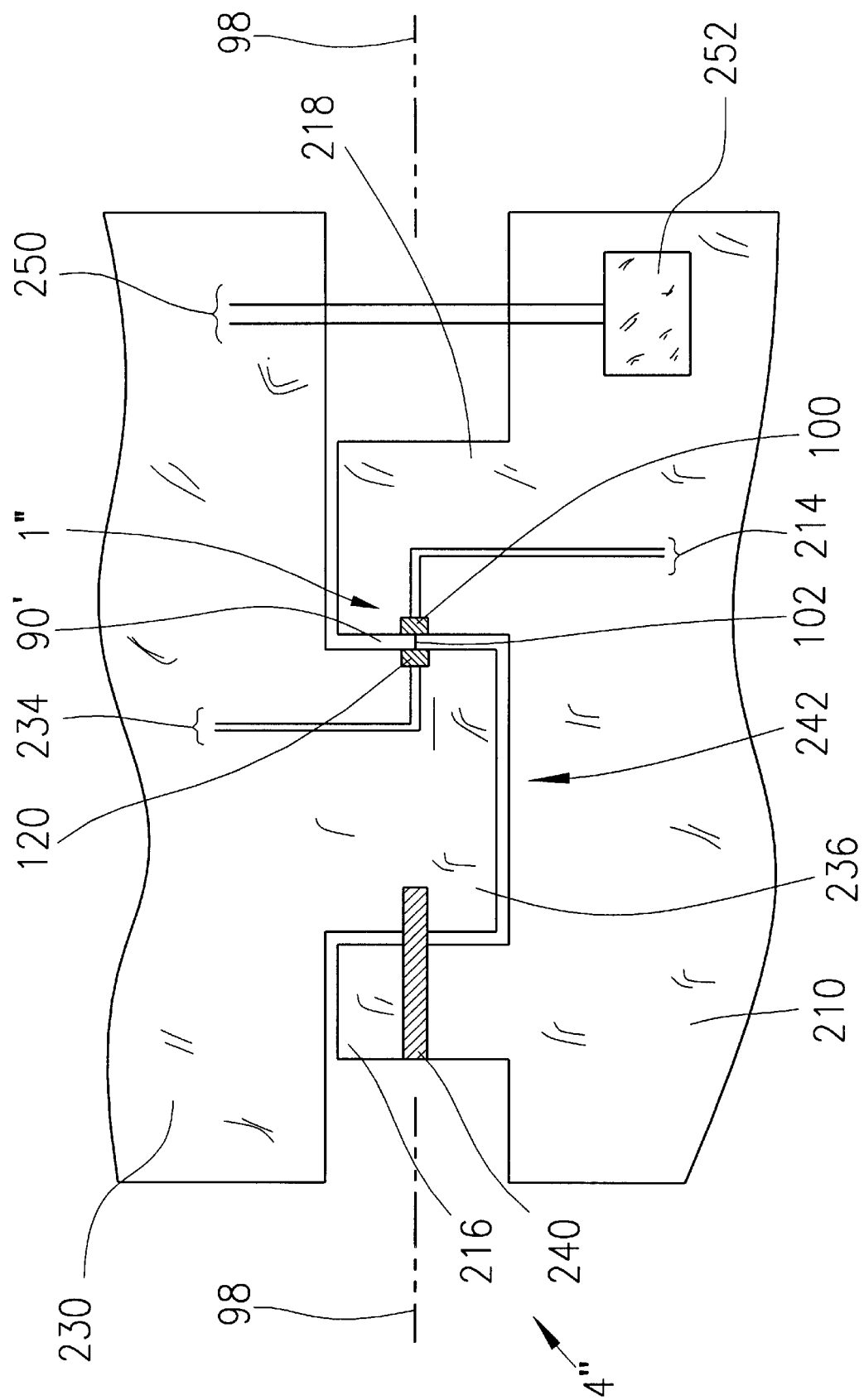
FIG. 5b is a diagrammatic representation illustrating yet another embodiment of the optical hinge apparatus.
Figure 5C:
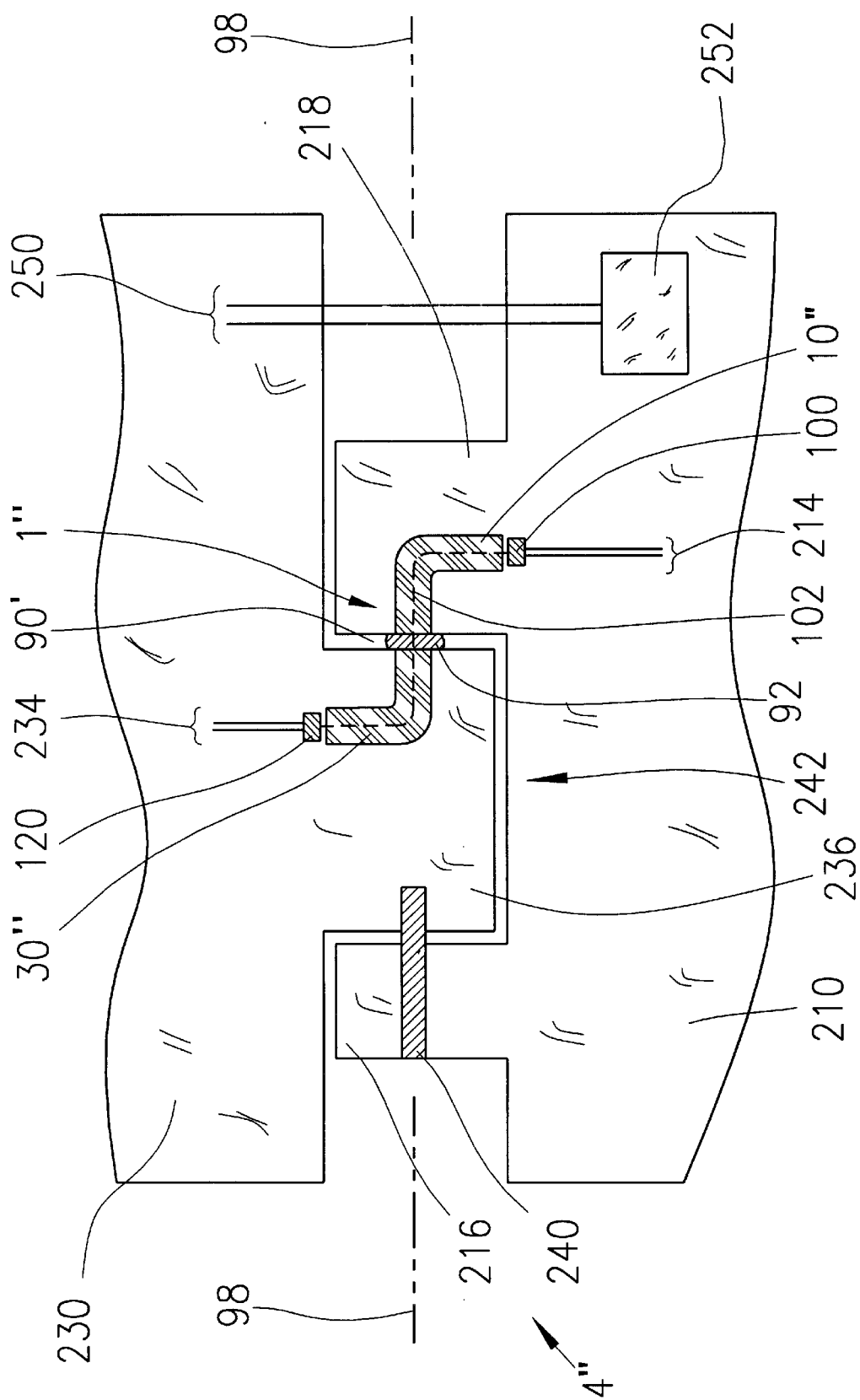
FIG. 5c is a diagrammatic representative illustrating a further embodiment of the optical hinge apparatus.

It should be noted that the air gap 90, as shown in FIGS. 2 and 4, and the air gap 90', as shown in FIGS. 5a and 5b, are defined by two dense-rare boundaries of optical materials. These optical materials may have the same index of refraction or different indices of reflection. In order to improve the optical coupling between the two dense-rare boundaries, it is possible to fill the air gap 90, 90' with a fluid 92 for index matching, as shown in FIG. 5c.

Using the optical linkage, as shown in FIGS. 3 to FIG. 5c, communication signals can be transmitted from a photo-transmitter on one circuit board to a photo-receiver on another circuit board in a form of optical data. Thus, the optical linkage can be used to replace flat cables, which are usually used to transmit communication signals in hand-held electronic devices. FIG. 6 shows a possible way of conveying signals between the first circuit board 210 and the second circuit board 230 in a mobile phone or a communicator. As shown, the first circuit board 210 has a keypad section 262 and phone engine 264 to process communication data or signals, and the second circuit board 230 has a display 260. The two circuit boards are jointed together by an opto-mechanical hinge system (see FIGS. 3–5c). Using the light beam 102 that optically connects the photo-transmitter 110 and the photoreceiver 120, optical data 300 can be conveyed from the phone engine 264 to the display 260. Using the electric wires 250, DC power 310 can be provided to the second circuit board 230 and the display 260. It is possible to use the same electric wires 250 to convey feedback signal, or reverse data flow, 320 from the second circuit board 230 to the phone engine 264 on the first circuit board 210. The feedback signal 320 can be transmitted electrically in the form of small AC signals on top of the DC power 310. Thus, FIG. 6 illustrates the principle of conveying electrical signals from one circuit board through another, even though flat cables have been eliminated.

Figure 7:
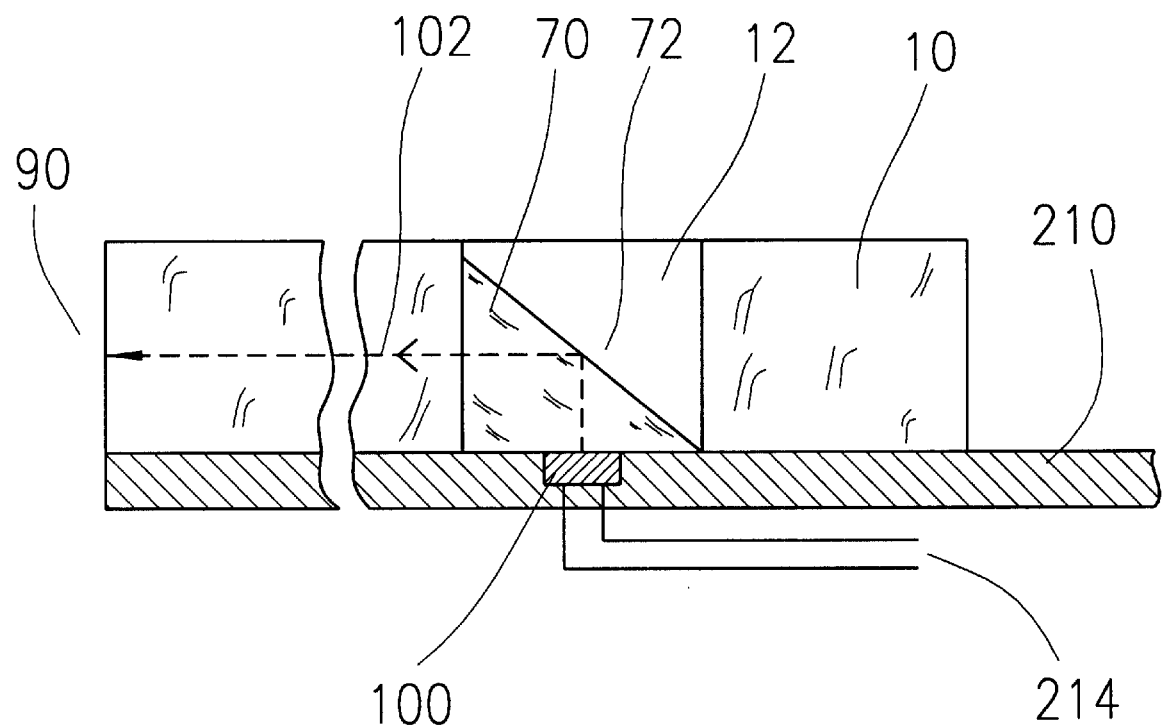
FIG. 7 is a diagrammatic representation illustrating an optical coupling device for coupling an optical hinge to a circuit board.

FIG. 7 shows another way to couple an opto-electronic device to an optical component of an optical hinge. Instead of inserting the opto-electronic device into the cavity of the optical component, as shown in FIGS. 2 and 3, a prism-like device 70 can be inserted into the cavity 12 of the optical component 10, as shown in FIG. 7. As shown in FIG. 7, the prism-like device 70 has a reflecting surface 72 for directing the light beam 102 originated from the opto-electronic device 100 towards the air gap 90.

FIGS. 8a and 8b illustrate the relationship between the light beam 102 and the rotation axis 98 of the opto-mechanic hinge system. As shown in FIG. 8a, a light beam 102 is transmitted through the air gap 90 from one optical component to another optical component. If the light beam is transmitted along the optical path 112, which is substantially coincident with the rotation axis 98, the light beam hits the opto-electronic device 120 at a fixed point O, regardless of the rotation angle α (see FIG. 1). However, if the light beam is transmitted along an "off-axis" optical path 112', it hits the opto-electronic device 120 at a point O' which is at a distance r from the fixed point O. As shown in FIG. 8b, the location of the point O' changes with the rotation angle α, along a circle 150. For example, at a certain rotation angle α, the light beam originated from the photo-transmitter 110 (FIG. 8a) can only be received by a photosensing element 162 placed along the circle 150. However, if the optical components of the optical hinge are rotated relative to each other by another 90 degrees, the light beam can only be received by a photosensing element 164 on the circle 150. Thus, by placing a plurality of photosensing elements on the circle 150, it is possible to send different optical data from one photo-transmitter in one circuit board to different photo-receivers on another circuit board, based on the rotation angles of the optical hinge. In that respect, it is possible to design an optical hinge such that it has different functionality when the electronic device is opened or closed. For example, the optical hinge can be used to connect the keyboard circuit board to the display circuit board in order to display communication data when the electronic device is opened. But when the electronic device is closed, the same optical hinge can be used to connect the keyboard circuit board to a personal computer.

Figures 9A, 9B:
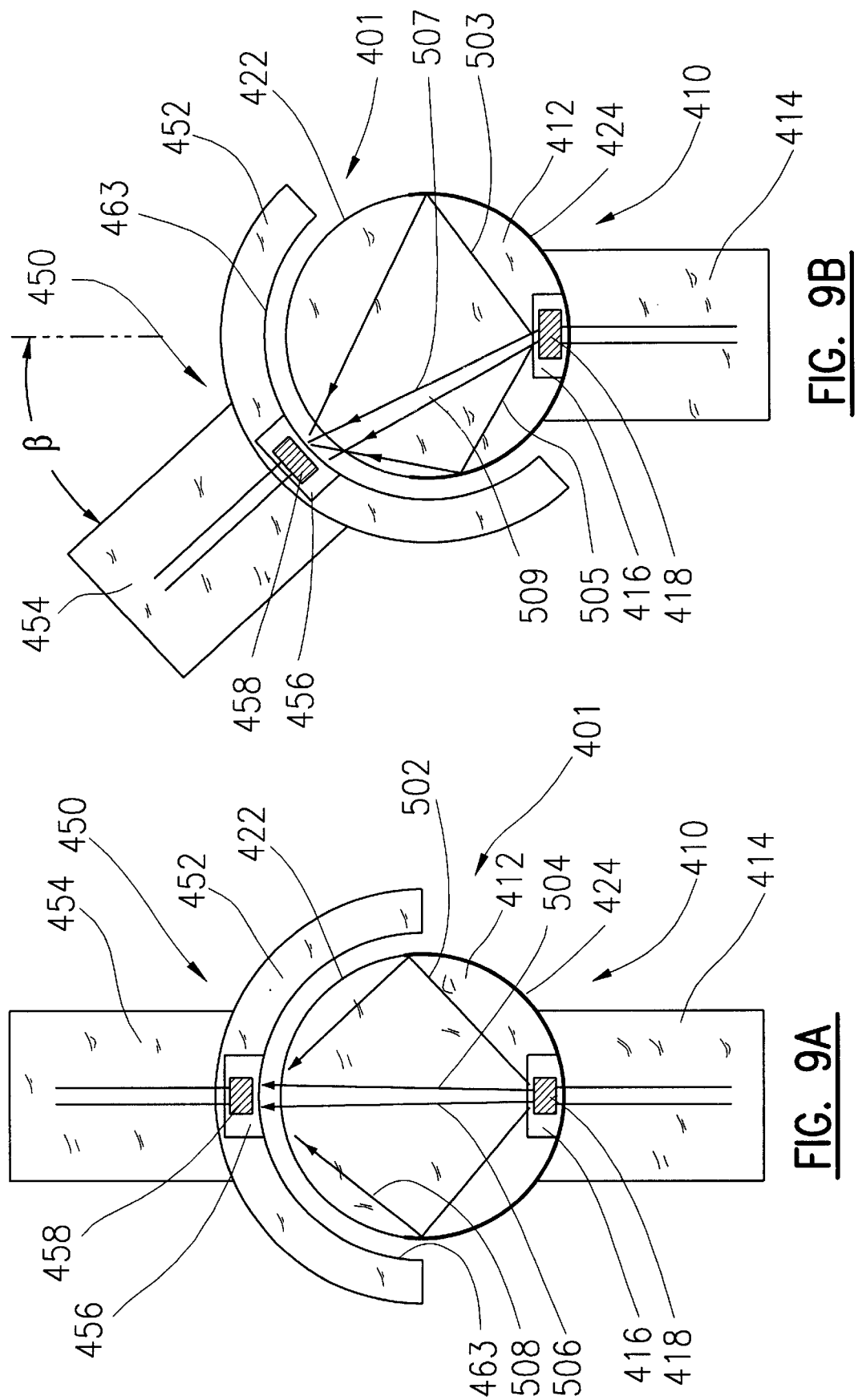
FIG. 9a is a cross-sectional representation illustrating another embodiment of the optical hinge operated at one rotation angle.
FIG. 9b is a cross-sectional representation illustrating the optical hinge operated at another rotation angle.

FIGS. 9a and 9b illustrate another embodiment of the optical hinge 401, which can be constructed in the form of a ball-joint. As shown, the optical hinge 401 comprises a first optical component 410 and a second optical component 450, which can be rotated relative to the first optical component 410 over a two-dimensional angular range. The first optical component 410 includes a sphere 412, which is made of an optical material and is joined to a supporting body 414. The sphere 412 has a cavity or recess 416 in order to allow the first optical component to be optically coupled to a first opto-tranceiver 418. The second optical component 450 includes a hemisphere 452 joined by a supporting body 454. The hemisphere 452 also has a cavity or recess 456, which is optically coupled to a second opto-tranceiver 458. The surface 422 of the sphere 412 and the inner surface 463 of the hemisphere 452 define a gap 490, allowing the second optical component 450 to rotate relative to the first optical component 410. The recess 416 has a surface, which can be flat or curved, to allow light rays 502, 504, . . . , 508 to be transmitted into the sphere 412. As shown in FIG. 9a, while light rays 504, 506 can directly reach the second opto-tranceiver 458 through the gap 490, light rays 502,508 are reflected by the surface 422 before reaching the second opto-tranceiver 458. When the second optical component 450 is rotated by an angle β as shown in FIG. 9b, while light rays 507, 509 can reach the second opto-tranceiver 458 through the gap 490, light rays 503, 505 are reflected by the spherical surface 422 before reaching the second opto-tranceiver 458. In order to increase the optical coupling efficiency between the first optical component 410 and the second optical component 450, it is possible to silver part of the sphere surface 422. The silvered section of the surface 422 is denoted by reference numeral 424.

The optical hinge and the optical hinge apparatus, as described above, can be used for one-way data transmission or two-way data transmission. If two-way data transmission is used, it is easy to monitor the status of the hinge. For example, a feedback signal can be conveyed from the second circuit board to the first circuit board to indicate the light level received by the opto-electronic device of the second circuit board. If the hinge is broken or damaged, a "low light" message can be conveyed to first circuit board to cause the power to cut down. Thus, eye safety protection is achieved even when light may escape from the optical hinge because of the damage. Furthermore, because the optical paths between the photo-transmitter and the photo-receiver can be made very short, the light level that is used to transmit optical data can be kept very low so as to improve the eye safety aspect of the electronic device. Low light level can also have the advantage of saving battery power.

The optical hinge and the optical hinge apparatus do not have any practical limits to the data transfer capacity. Some properties are stemmed from the photo-transmitter and the photo-receiver components. Furthermore, the optical hinge can be used to conduct light for illumination purposes.

It should be noted that the description, taken in conjunction with FIGS. 1 to 8b, is only used to demonstrate the principle of the optical hinge and the optical hinge apparatus. With this teaching, it is possible to make various changes without departing from the disclosed principle. For example, it is preferred that the light beam 102 undergoes total internal reflection when it encounters a dense-rare boundary at the surface 20 and at the surface 40. It is possible that the surface 20 and the surface 40 are silvered, if so desired. The first optical component 10 and the second optical component 30 can be made from glass or a clear plastic, or any suitable material which is transparent to the wavelength of interest. The optical waveguides 10" and 30" can be L-shaped, as shown in FIG. 5a, but they can be straight or curved differently. They can be made of optical fibers or simply a short piece of plastic or glass. Moreover, the surface 20 (FIG. 2) can be spherical or aspherical.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. An optical hinge for providing an optical link between a first opto-electronic device capable of providing a light beam and a second opto-electronic device, said optical hinge comprising:

a first optical component having a first mechanical engagement member, and a second optical component having a second mechanical engagement member for mechanically engaging with the first mechanical engagement member for rotation along a rotation axis, wherein the first mechanical engagement member has a first dense-rare boundary surface, and the first optical component has a first cavity for optically coupling the first optical component to the first opto-electronic device, so as to allow the light beam to be transmitted through the first cavity toward the first dense-rare boundary surface of the first mechanical engagement member, and wherein the second optical component has a second cavity for optically coupling the second optical component to the second opto-electronic device, and the second mechanical engagement member has a second dense-rare boundary surface forming a gap with the first dense-rare boundary surface where the first and second mechanical engagement members are mechanically engaged for rotation to allow the light beam to be transmitted through the first dense-rare boundary surface, the gap, and then the second dense-rare boundary surface of the second mechanical engagement member toward the second cavity in order to reach the second opto-electronic device at different rotation angles.

2. The optical hinge of claim 1, wherein the light beam is transmitted through the first cavity along a first optical path, and the first optical component further comprises an optical path altering means for directing the light beam transmitted along the first optical path towards the gap along a second optical path different from the first optical path.

3. The optical hinge of claim 2, wherein the second optical component further comprises a further optical path altering means for directing the light beam transmitted along the second optical path towards the second cavity along a third optical path different from the second optical path.

4. The optical hinge of claim 2, wherein the optical path altering means comprises a reflecting surface.

5. The optical hinge of claim 4, wherein the reflecting surface is a total internal reflection surface.

6. The optical hinge of claim 3, wherein the further optical path altering means comprises a reflecting surface.

7. The optical hinge of claim 6, wherein the further reflecting surface is a total internal reflection surface.

8. The optical hinge of claim 2, wherein the first cavity has a curved surface for focusing the light beam prior to the light beam being transmitted along the first optical path.

9. The optical hinge of claim 8, wherein the curved surface is spherical.

10. The optical hinge of claim 4, wherein the reflecting surface is a curved surface for focusing the light beam while directing the light beam towards the second optical path.

11. The optical hinge of claim 10, wherein the curved surface is spherical.

12. The optical hinge of claim 1, wherein the first optical component has at least one socket and the second optical component has at least one stud mechanically engaged in the socket, so as to allow the second optical component to rotate relative to the first optical component along the rotation axis.

13. The optical hinge of claim 2, wherein the second optical path is substantially coincident with the rotation axis.

14. The optical hinge of claim 2, wherein the second optical path is substantially parallel to the rotation axis and has a distance from the rotation axis, and the second opto-electronic device has different area sections to receive the light beam, depending on the rotation angle.

15. The optical hinge of claim 1, wherein the gap is an air gap.

16. The optical hinge of claim 1, wherein the gap is filled with a fluid for optically coupling the first dense-rare boundary surface to the second dense-rare boundary surface through index matching.

17. An optical hinge apparatus for providing an optical link between a first circuit board having a first opto-electronic device capable of providing a light beam, and a second circuit board having a second opto-electronic device, wherein the first circuit board is mechanically linked to the second circuit board, so as to allow the second circuit board to rotate relative to the first circuit board along a rotation axis, said optical hinge apparatus comprising:
  a first optical component mounted on the first circuit board; and
  a second optical component mounted on the second circuit board, wherein the first optical component has a first dense-rare boundary surface, and the second optical component has a second dense-rare boundary surface adjacent to the first dense-rare boundary surface, defining a gap, which remains substantially uniform in different rotation angles, and wherein the first optical component is optically coupled to the first opto-electronic device to receive the light beam in order to transmit the light beam through the gap to the second optical component, and wherein the second component is optically coupled to the second opto-electronic device in order to transmit the light beam to the second opto-electronic device.

18. The optical hinge apparatus of claim 17, wherein the gap is located substantially at the rotation axis.

19. The optical hinge apparatus of claim 17, wherein the gap is an air gap.

20. The optical hinge apparatus of claim 17, wherein the gap is filled with a fluid for optically coupling the first dense-rare boundary surface to the second dense-rare boundary surface through index matching.

21. The optical hinge apparatus of claim 17, wherein the first optical component comprises:
  a first cavity for optically coupling the first optical component to the first opto-electronic device, so as to allow the light beam to be transmitted through the first cavity along a first optical path; and
  a first optical path altering means to direct the light beam from the first optical path towards the second optical path through the gap, and wherein the second component has a second optical path altering means to redirect the light beam transmitted through the air gap towards the second cavity so as to allow the light beam to reach the second opto-electronic device along a third optical path.

22. The optical hinge apparatus of claim 21, wherein the first means comprises a reflecting surface.

23. The optical hinge apparatus of claim 21, wherein the first means comprises a total internal reflection surface.

24. The optical hinge apparatus of claim 21, wherein the second means comprises a reflecting surface.

25. The optical hinge apparatus of claim 21, wherein the second means comprises a total internal reflection surface.

26. The optical hinge apparatus of claim 21, wherein the first cavity has a spherical surface for focusing the light beam prior to the light beam being transmitted along the first optical path.

27. The optical hinge apparatus of claim 22, wherein the reflecting surface has a spherical surface for focusing the light beam while directing the light beam towards the second optical path.

28. The optical hinge apparatus of claim 21, wherein the second optical path is substantially coincident with the rotation axis.

29. The optical hinge apparatus of claim 21, wherein the second optical path is substantially parallel to the rotation axis.

30. The optical hinge apparatus of claim 21, wherein the first circuit board has at least one mounting pin and the first optical component has at least a mounting hole engaged with the mounting pins for mounting the first optical component to the first circuit board.

31. The optical hinge apparatus of claim 21, wherein the light beam is capable of carrying communication data, and wherein the first circuit board further comprises data lines connecting to the first opto-electronic device, and the second circuit board further comprises data lines connecting to the second opto-electronic device, so as to allow the first circuit board to communicate with the second circuit board by transmitting communication data via the light beam.

32. The optical hinge apparatus of claim 21, wherein the first opto-electronic device comprises a light emitter.

33. The optical hinge apparatus of claim 21, wherein the first opto-electronic device comprises an optical transceiver.

34. The optical hinge apparatus of claim 21, wherein the second opto-electronic device is a photosensor.

35. The optical hinge apparatus of claim 21, wherein the second opto-electronic device comprises an optical transceiver capable of transmitting a further light beam to the first opto-electronic device.

36. The optical hinge apparatus of claim 21, wherein the light beam carries light waves in infrared frequencies.

37. The optical hinge apparatus of claim 21, wherein the first optical component comprises an optical waveguide.

38. The optical hinge apparatus of claim 21, wherein the second optical component comprises an optical waveguide.

39. An opto-mechanical device (4) for providing an optical link, comprising:
  a first opto-electronic device (100) for providing a light beam (102) over said optical link; and
  an optical hinge (1) for guiding said light beam from said first opto-electronic device to said second opto-electronic device and for providing rotatability of said optical link during transmission of said light beam between said first opto-electronic device and said second opto-electronic device, wherein said optical hinge comprises a first optical component (10) optically connected to a second optical component (30) via a gap (90), said gap remains substantially uniform in different rotation angles, and wherein said first optical component is rotatable with respect to said second optical component for providing said rotatability of said optical link.

40. The device of claim 39, wherein said first optical component is also mechanically connected to said second optical component by at least one stud (42, 44) of one of said optical components inserted in a corresponding at least one socket (22, 24) of another of said optical components.

41. The device of claim 40, wherein said at least one stud and said at least one corresponding socket are optically transparent to said light beam.

42. The device of claim 39, wherein the first optical component has at least one socket (22, 24) and the second optical component has at least one stud (42, 44) mechanically engaged in the socket, so as to allow the second optical component to rotate relative to the first optical component.

43. The device of claim 39, wherein said first optical component (10') is housed on a first object (210) facing said second optical component (30') housed on a second object (230) connected to said first object by at least one axle (240).

44. The device of claim 43, wherein said first optical component (10') and said second optical component (30') are housed in recesses (220, 238) in joint sections (218, 236) of said first object (210) and said second object (230), respectively.

45. The device of claim 40, wherein said first optical component (10') is housed on a first object (210) facing said second optical component (30') housed on a second object (230) connected to said first object by at least one axle (240), and said first and second optical components (10', 30') are housed in recesses (220, 238) in joint sections (218, 236) of said first object (210) and said second object (230), respectively.

46. The device of claim 43, wherein said first optical component (10") and said second optical component (30") are optical waveguides optically connected by an air gap (90').

47. The device of claim 43, wherein said first optical component (10") and said second optical component (30") are optical waveguides optically connected by a fluid (92).

48. The device of claim 39, further comprising one or more additional opto-electronic devices (162, 164) for receiving said light beam at different rotation angles of said optical link.

49. The device of claim 48, wherein one of said first opto-electronic component (410) and said second opto-electronic (450) component together form a ball-joint (401).

50. The device of claim 39, further comprising one or more additional opto-electronic devices for transmitting and receiving an additional light beam at a wavelength different from said light beam (102) provided by said first device (100).

51. An opto-mechanical device (4) for providing an optical link between a first opto-electronic device (100), for providing a light beam (102) over said optical link, and a second opto-electronic device (120), for receiving said light beam over said optical link, characterized by a first optical component (10) optically connected to a second optical component (30) via a substantially uniform gap (90) by rotatability of said first optical component with respect to said second optical component in different rotation angles, and by said first optical component and said second optical component together forming an optical hinge (1) for providing rotatability of said optical link during transmission of said light beam between said first opto-electronic device and said second opto-electronic device.

52. The device of claim 51, characterized by said first optical component mechanically connected to said second optical component by at least one stud (42, 44) of one of said optical components inserted in a corresponding at least one socket (22, 24) of the other one of said optical components.

53. The device of claim 52, characterized by optical transparency to said light beam in said at least one stud and said at least one corresponding socket.

54. The device of claim 51, characterized by said first optical component having at least one socket (22, 24) and said second optical component having at least one stud (42, 44) mechanically engaged in the socket, so as to allow the second optical component to rotate relative to the first optical component.

55. The device of claim 51, characterized by said first optical component (10') housed on a first object (210) facing said second optical component (30') housed on a second object (230) connected to said first object by at least one axle (240).

56. The device of claim 55, characterized by said first optical component (10') and said second component (30') housed in recesses (220, 238) in joint sections (218, 236) of said first object (210) and said second object (230), respectively.

57. The device of claim 52, characterized by said first optical component (10') housed on a first object (210) facing said second optical component (30') housed on a second object (230) connected to said first object by at least one axle (240), and said first and second optical components (10', 30') are housed in recesses (220, 238) in joint sections (218, 236) of said first object (210) and said second object (230), respectively.

58. The device of claim 55, characterized in that said first optical component (10") and said second optical component (30") are optical waveguides optically connected by an air gap (90').

59. The device of claim 55, characterized in that said first optical component (10") and said second optical component (30") are optical waveguides optically connected by a fluid (92).

60. The device of claim 51, characterized by one or more additional opto-electronic devices (162, 164) for receiving said light beam at different rotation angles of said optical link.

61. The device of claim 60, characterized by said first opto-electronic component (410) and said second opto-electronic (450) component together forming a ball-joint (401).

62. The device of claim 51, characterized by one or more additional opto-electronic devices for transmitting and receiving an additional light beam at a wavelength different from said light beam (102) provided by said first device (100).

* * * * *